(12) United States Patent
Thorn et al.

(10) Patent No.: US 7,027,052 B1
(45) Date of Patent: Apr. 11, 2006

(54) TREEMAP DISPLAY WITH MINIMUM CELL SIZE

(75) Inventors: Matthew Thorn, Livermore, CA (US); Donald Hoffman, Mountain View, CA (US)

(73) Assignee: The Hive Group, San Mateo, CA (US)

(*) Notice: Subject to any disclaimer, the term of this patent is extended or adjusted under 35 U.S.C. 154(b) by 584 days.

(21) Appl. No.: 10/219,157

(22) Filed: Aug. 13, 2002

Related U.S. Application Data (60) Provisional application No. 60/312,325, filed on Aug. 13, 2001.

(51) Int. Cl.
 *G06T 11/20* (2006.01)
(52) U.S. Cl. ........................ 345/440; 717/144
(58) Field of Classification Search ............ 340/825.02; 341/79, 148; 345/440; 370/408, 539, 541, 370/FOR. 189; 382/226, 240; 709/252, 709/FOR. 155; 715/853, FOR. 206; 717/144
See application file for complete search history.

(56) References Cited

U.S. PATENT DOCUMENTS
2004/0168115 A1* 8/2004 Bauernschmidt et al. ... 715/500

FOREIGN PATENT DOCUMENTS
EP 572335 A2 * 12/1993

* cited by examiner

*Primary Examiner*—Matthew C. Bella
*Assistant Examiner*—G. F. Cunningham
(74) *Attorney, Agent, or Firm*—Fernandez & Associates LLP (57) ABSTRACT

A treemap with cells that have a minimum size so that large data sets can be clearly represented. A treemap that represents a plurality of data elements is generated, the treemap including a plurality of two-dimensional cells. Each cell represents a corresponding data element in the data set. The treemap includes a portion of a display screen assigned to a first cell so that the first cell has a size. A portion of the display screen is then assigned to a subsequent cell. The size of the first cell is adjusted in order to compensate for a size of the subsequent cell and to maintain the minimum cell size.

20 Claims, 8 Drawing Sheets

TREEMAP DISPLAY WITH MINIMUM CELL SIZE

REFERENCE TO RELATED APPLICATIONS

This application claims priority of co-pending U.S. Provisional Patent Application Ser. No. 60/312,325 entitled "Generation Engine for Treemap Display with Minimum Cell Size", filed Aug. 13, 2001. Priority of the filing date of Aug. 13, 2001 is hereby claimed, and the disclosure of said Provisional Patent Application is hereby incorporated by reference.

BACKGROUND OF THE INVENTION

1. Field of the Invention

This invention relates generally to data display systems, and more particularly to a system for displaying data in a treemap format.

2. Description of the Related Art

A treemap display is a visual representation of a data set with portions of the data hierarchically represented as two-dimensional cells on a computer display screen. The cells typically have attributes, such as size and color, that represent various characteristics of the data. For example, the size of a cell can represent one characteristic of the data and the color of the cell can represent another characteristic of the data. A computer user can navigate to one of the cells and obtain information about the data characteristics.

A treemap can be used to compactly represent long lists of data that would otherwise be spread over several pages. The data can comprise hundreds or even thousands of data elements, each element being represented by one of the cells on the treemap display. While it can be convenient to represent such a multitude of data in a single treemap, there are also drawbacks that arise as the amount of data increases. For example, as the quantity of data elements represented on a treemap is increased, the quantity of cells on the treemap also increases. This can result in a single treemap with thousands of cells, many of which are so small in size that they become indiscernible from other cells on the treemap. Thus, the treemap loses the ability to efficiently display various aspects of a complex data set using cell size and color because the small cell size makes it difficult to discern one cell from another cell on the treemap, making navigation of the display difficult.

From the discussion above, it should be apparent that there is a need for an improved method of creating a treemap that represents large data sets. The present invention fulfills this need.

SUMMARY OF THE INVENTION

In accordance with the invention, a treemap display is generated on a computer display screen. The display cells of the treemap display have a minimum size so that large data sets can be clearly represented in a treemap form and can be easily navigated. Generation of the treemap display includes assigning a portion of the treemap field to a first cell so that the first cell has a predetermined size. A portion of the treemap field is then assigned to a subsequent cell. The size of the first cell is adjusted in order to compensate for a size of the subsequent cell. Each of the cells has a minimum size such that adjustment of a cell size maintains the minimum cell size. The field of the treemap display is then rendered on a display screen for viewing.

Other features and advantages of the present invention should be apparent from the following description of the preferred embodiment, which illustrates, by way of example, the principles of the invention.

DETAILED DESCRIPTION

Figure 1:
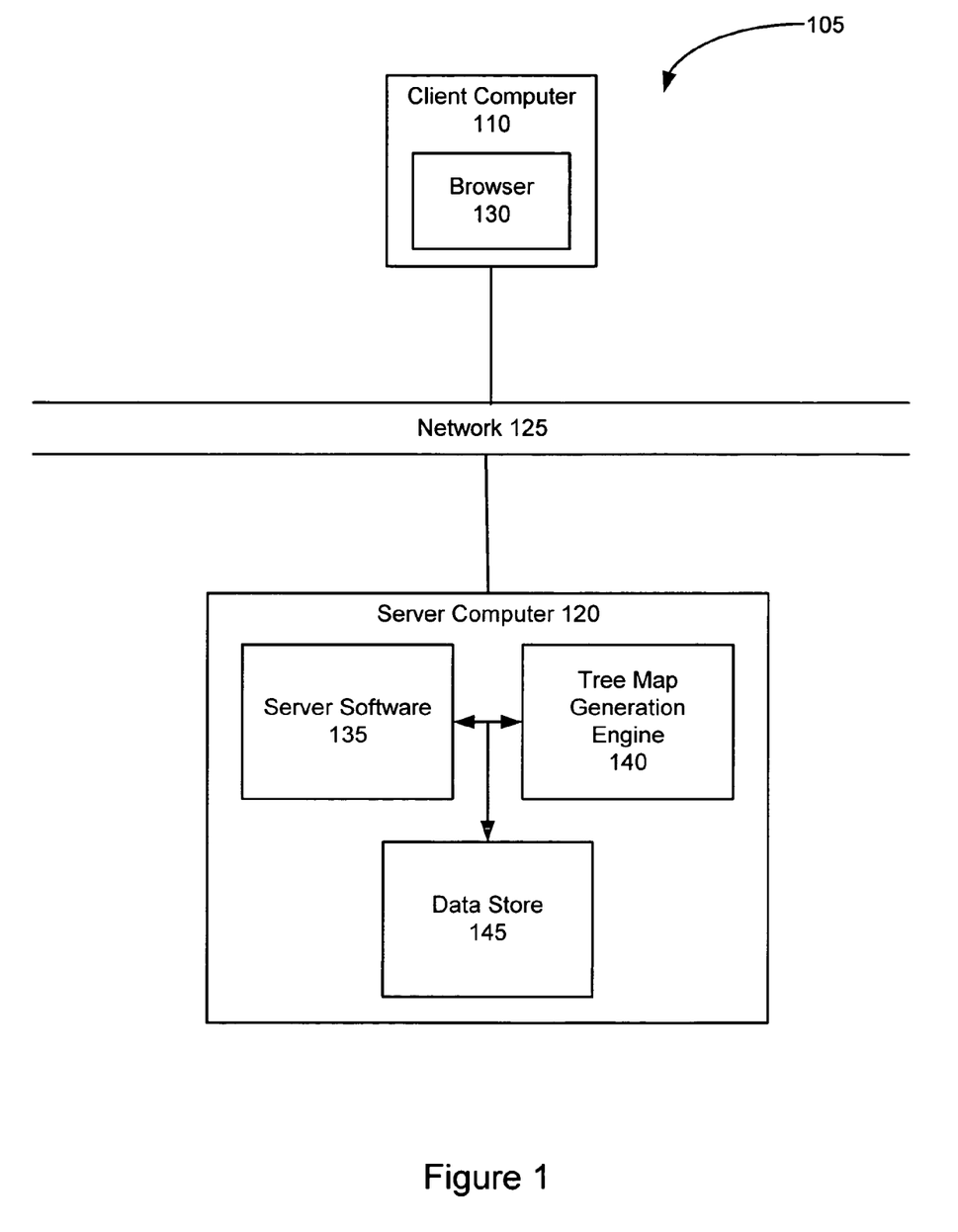
FIG. 1 is a block diagram of a computer network system.

FIG. 1 is a block diagram of a computer network system 105 comprised of at least one client computer 110 and a server computer 120, which are nodes of a computer network 125, such as the Internet. As used herein, the term "Internet" refers to a collection of interconnected (public and/or private) networks that are linked together by a set of standard protocols (such as TCP/IP and HTTP) to form a global, distributed network. FIG. 1 shows only a single client computer and a single server computer, although the computer network system 105 could include a plurality of such devices. The client computer includes a display screen on which the treemap display can be viewed.

In accordance with the invention, the server computer 120 includes a treemap generation engine 140 that is configured to dynamically generate a treemap display (or data that can be used by a computer to draw a treemap display) based upon a data set and other inputs such as might be obtained from a data store 145. It should be understood that the source of data can be located in a data store at any location of the network 125. A treemap is a visual representation of a data set with portions of the data hierarchically represented as two-dimensional cells on a display screen. The resulting treemap display includes cells that have a minimum size so that large data sets can be clearly represented in a treemap form. The treemap display enables the visualization of large, unstructured content databases, such as data that is distributed over a computer network.

Figure 2:
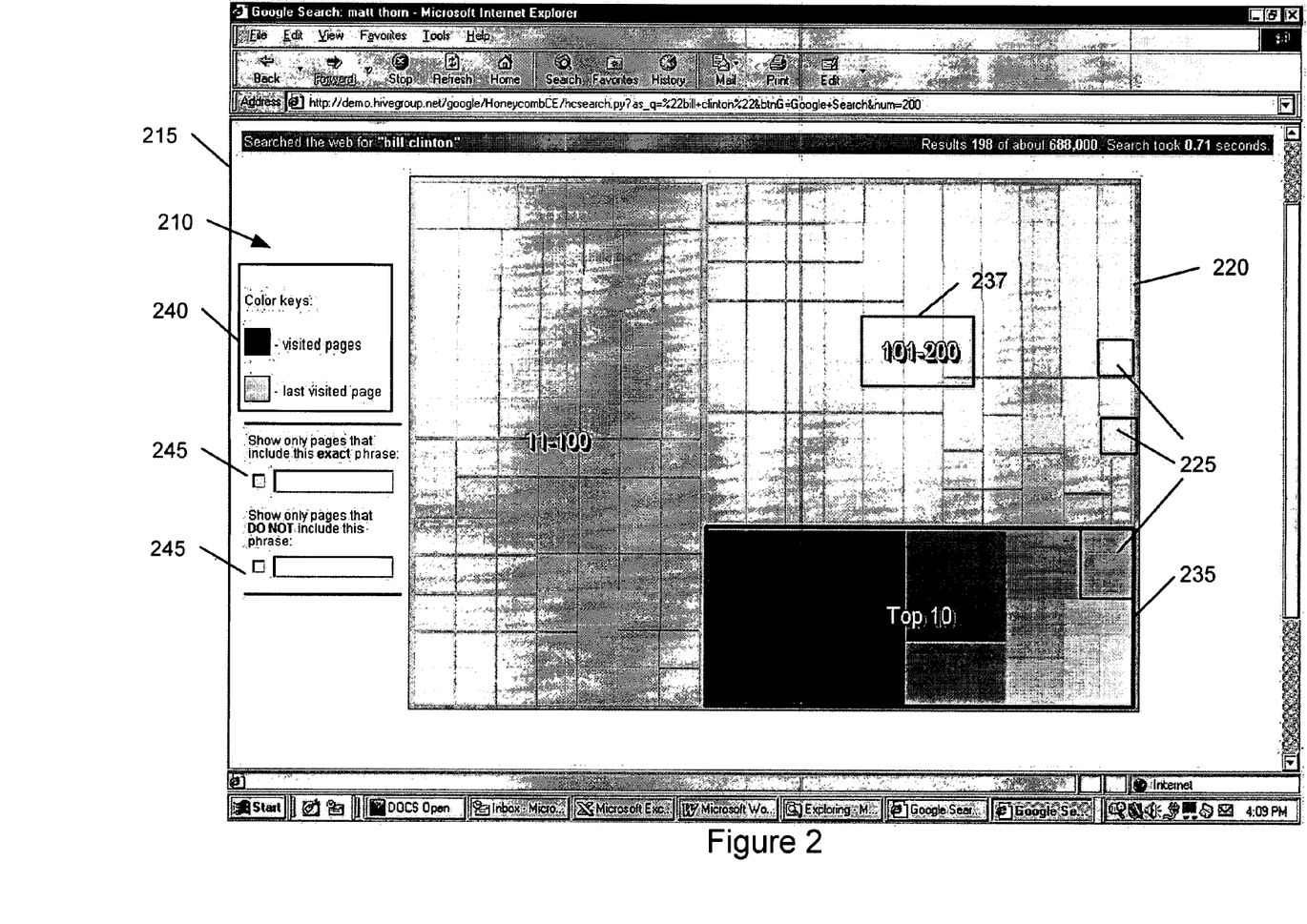
FIG. 2 is an illustration of a treemap display screen produced in accordance with the invention.

FIG. 2 shows an exemplary treemap display page 210 on a computer display in a window 215 of a browser executing at the client computer 110. The treemap display page 210 includes a treemap field 220 comprised of a plurality of cells 225 that represent a data set. Each cell 225 has a geometric shape that consumes a given display region of the browser window 215, though individual cells may have different dimensions. Each cell 225 represents a data element of the data set that is visually represented by the treemap field 220. In the preferred embodiment, the cells 225 are grouped into one or more cell groups 235, each comprised of a collection of cells 225 that have common characteristics. The groups 235 can include group labels 237 that identify the groups, such as "Top 10", "11–100", and "101–200."

Figure 6:
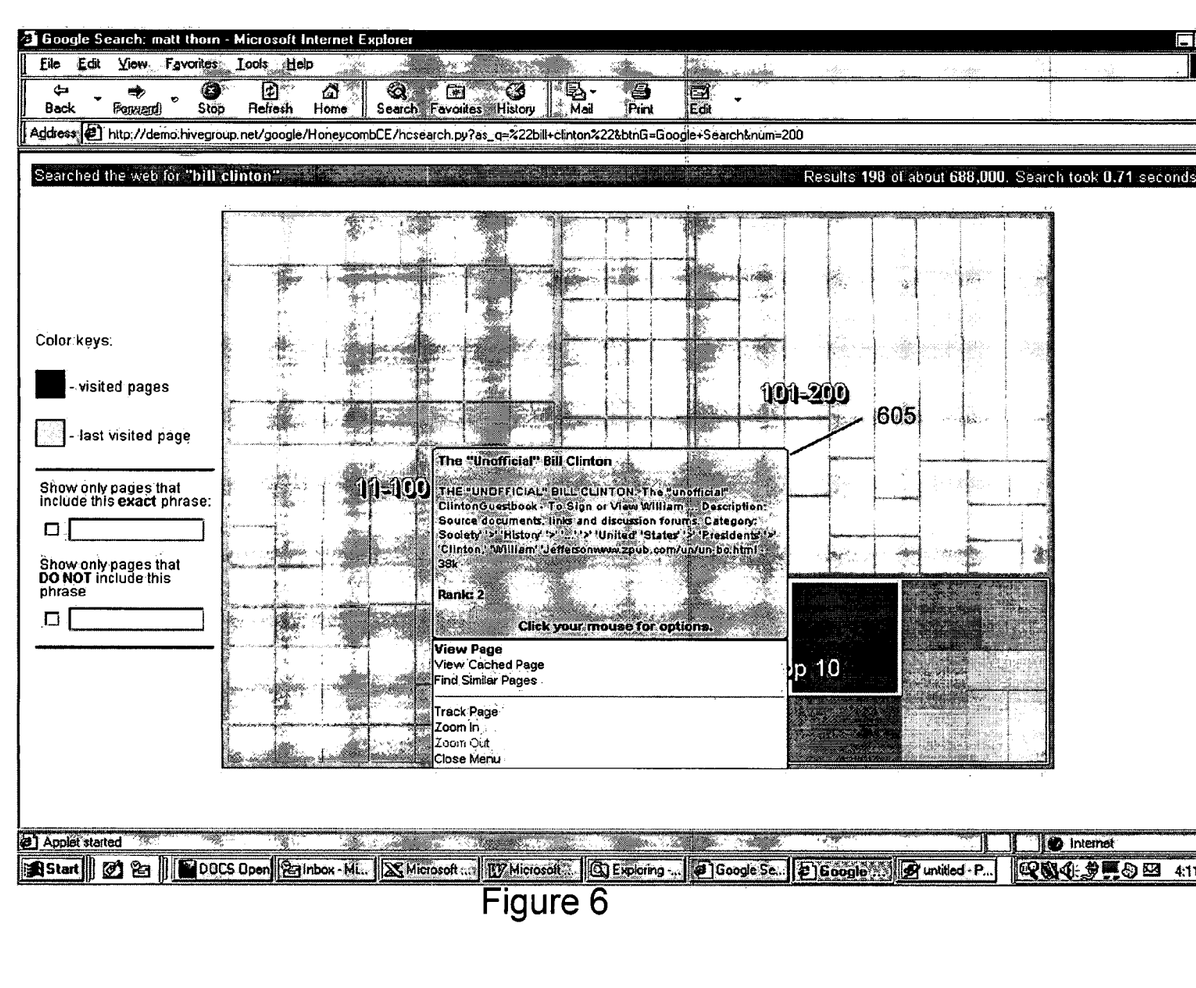
FIG. 6 is an illustration of a treemap display screen shot, showing a field detail frame superimposed over a treemap field.

A user can navigate a display cursor to one of the cells and can view detailed information about the cell by designating that cell, such as by a display mouse click or moving a mouse over a cell. For example, FIG. 6 shows a field detail frame 605 that is displayed in response to moving a display cursor over a cell and designating the cell, such as by a button click on a computer display mouse. The detail frame 605 includes information regarding the designated corresponding cell, which is illustrated in a shaded portion. In the preferred embodiment, the shaded portion is displayed whenever the computer cursor is positioned over the cell (a "mouseover" event). Below the detail frame 605 is shown a menu of options that preferably are displayed when the user designates the cell with a mouse click. From the option menu, the user can select options to perform certain actions, such as "View Page" to view a Web page associated with the designated cell or to find similar Web pages. The user may also select a "Track Page" option to cause a tracking identifier to be superimposed over the cell associated with the detail frame 605.

Each cell 225 or group 235 has at least one attribute, such as color or size, that represents some aspect of the data set. For example, the cells in the "Top 10" group can be a different color from the cells of the other groups, or cells in the various groups 235 can be identified by a border or band around the cell of each group. In addition, the color of a cell 225 can be changed to indicate to the user a changed characteristic of the cell. For example, if a user has viewed data that is associated with a cell, then the cell color can be changed to a predetermined color, thereby indicating that the user has reviewed the cell detailed data. This assists the user in navigating the treemap.

Figure 7:
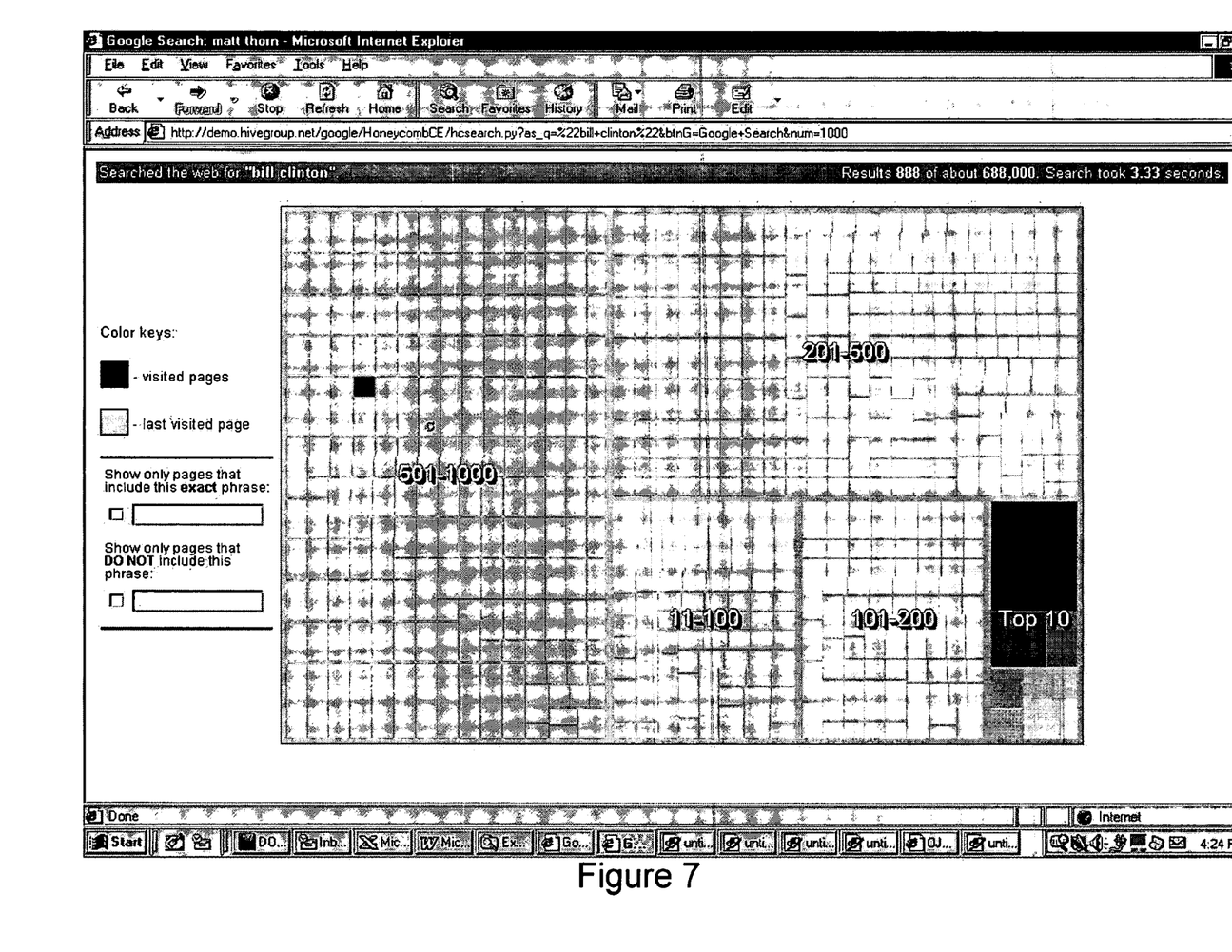
FIG. 7 is an illustration of a treemap display screen shot, showing a treemap field area that includes an increased quantity of cells.

FIG. 7 shows a cell that has been shaded more darkly than its neighbor cells, indicating that the user has positioned the display cursor over the cell and has designated that cell, to view the cell details. In the case where the cells represent links to Internet Web sites, the designation of a cell by shading indicates a cell whose corresponding Web page was viewed by the user. The status of a Web page as visited or not visited is information that can be tracked according well-known methods and the tracking data can be logged, such as by using an applet.

Returning to FIG. 2, the treemap field 220 may represent a variety of different data. For example, the treemap field 220 may represent the results of a search that was conducted using a search string on an Internet search engine. In such a case, each of the cells 225 may represent a Web page that the search engine identified as a result of the search and the pages may be located in different groups 235. A Web page comprises a hyperlink document that is written in a descriptive markup language, such as the Hyper Text Markup Language (HTML), and that is available over the Internet for viewing through an Internet browser program.

The treemap display page 210 includes a legend box 240 that identifies the significance of the color of the cells 225. The treemap display page 210 also includes filter fields 245 that allow a user to input filter criteria and filter cells to display only those cells that meet the user-specified criteria.

With reference again to FIG. 1, the client computer 110 is a computing device that includes a browser 130 that resides in the memory of the client computer 110. The browser 110 is a software application that is used to request and display data from the network 125.

The server computer 120 is a computing device that includes server software 135 that serves data to the client computer 110 over the network 125, such as by using the standard protocols of the World Wide Web. The server computer 120 is generally intended to encompass both the hardware and software server components that serve the data over the network 125. The server software 135 can be implemented as an application that resides in memory of the server computer 120. The server computer 120 is not limited to comprising a single computer device, as the server computer 120 could, for example, include multiple computer devices that are appropriately linked together.

FIG. 1 shows that a treemap generation engine 140 resides in the memory of the server computer. The treemap generation engine 140 is software that dynamically configures a treemap display from a set of inputs, as described more fully below. The treemap generation engine 140 outputs a markup language document that includes a description of a treemap that can be displayed by the browser 130 of the client computer 110.

The server computer 120 includes a data store 145 that can be used to store and retrieve data. The server software 135 and the treemap generation engine 140 can write data to the data store 145 and retrieve data from the data store 145.

Figure 3:
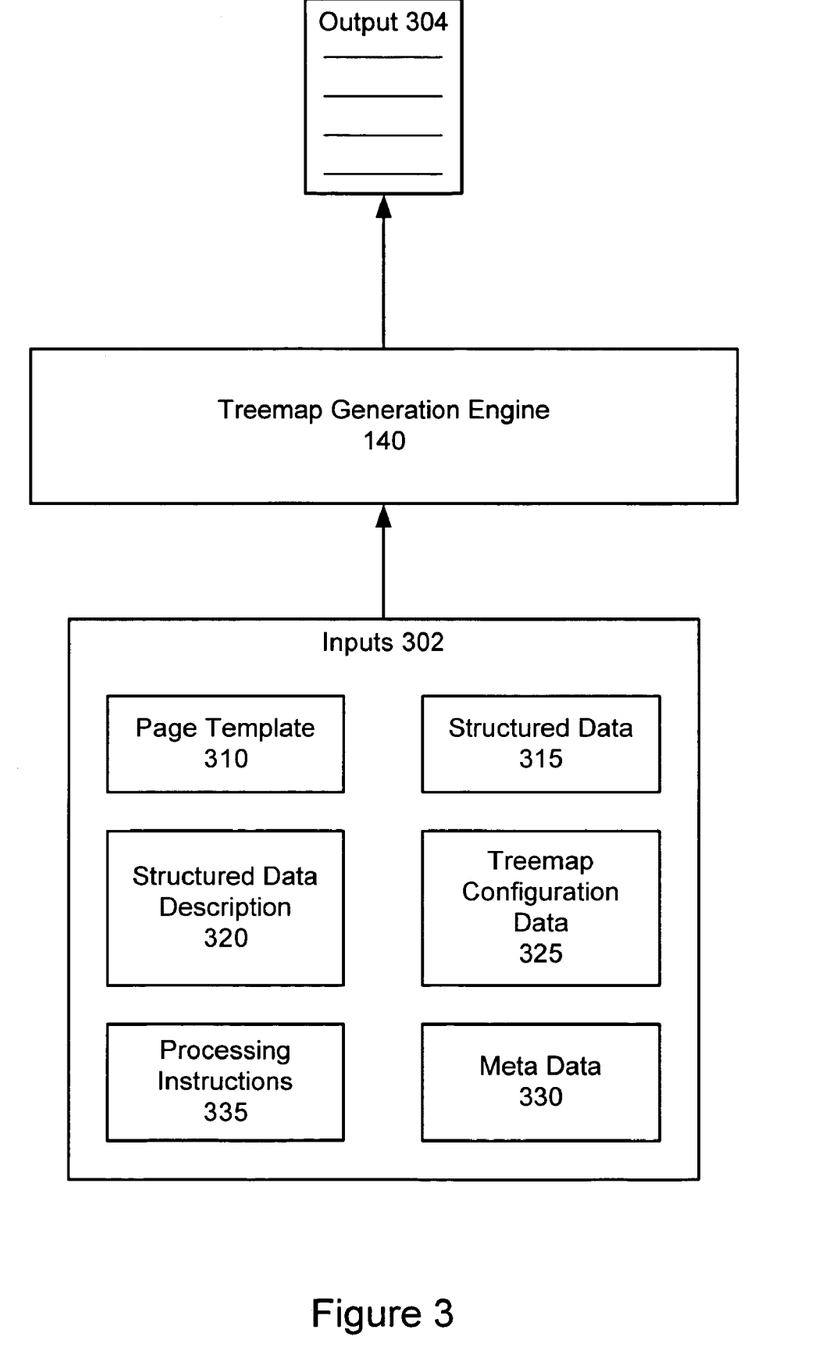
FIG. 3 is a block diagram that shows exemplary elements that comprise data inputs and outputs for a treemap generation engine.

FIG. 3 is a block diagram that shows the primary data elements that comprise inputs 302 to the treemap generation engine 140, as well as the display data elements that comprise an output 304 of the treemap generation engine 140. The inputs 302 generally include data comprised of information that defines the format of a treemap display page, and also describes data that will be represented by a treemap of the treemap display page. The inputs 302 include a page template 310 that is a template that specifies the configuration of a display page on which a treemap display will appear. The display page is preferably written in a markup language, such as HTML, although other markup languages may also be used.

The inputs 302 also include structured data 315, which comprise a raw data set that will be displayed in a treemap fashion. The structured data is preferably organized into one or more data elements, wherein each element includes a set of named attributes. Such an organization facilitates access by the treemap generation engine 140 to the attributes of each data element. The format of the structured data 315 may vary. The structured data may be in an extensible Markup Language (XML) format or in a low-level representation. The structured data 315 may comprise, for example, the output from an Internet search engine. The treemap generation engine 140 may perform some processing on the structured data 315 to place it in a suitable format for display as a treemap.

The inputs 302 also include a structured data description 320 that includes a description of the structured data 315 for use by the treemap generation engine 140. The structured data description 320 preferably includes information regarding the type of data and the format of the data in the structured data 315. It should be appreciated that the structured data description 320 may be explicitly or implicitly incorporated into the structured data 315.

Another input comprises treemap configuration data 325, which is data that specifies how the treemap display will be configured. The treemap configuration data 325 includes data such as colors, font sizes, fonts, and minimum cell sizes.

The inputs 302 to the treemap generation engine 140 further include meta data 330, which comprises high-level information regarding the structured data 315 and the client computer 110. The meta data 330 may include domain specific vocabulary that is used to determine various groupings of the data within the structured data 315. The meta data 330 may also include semantic information regarding the relationship of data elements in the structured data 315.

A set of processing instructions 335 comprises another input to the treemap generation engine 140. The processing instructions 335 specify how the structured data 315 and the meta data 330 are used to form the treemap display. The processing instructions 335 preferably identify the attributes in the data elements used to define a cell, and how the attributes are to be used and assembled for the treemap group, size, color, indicators, and filters. Additionally, the instructions describe any menu and mouseover window layouts that are associated with the treemap to be displayed. The processing instructions 335 may also describe how special groupings will be synthesized from the structured data 315 and the meta data 330. The processing instructions 335 also include information on how a raw set of data may be formatted as a treemap data structure. It should be understood that one or more of the inputs 302 may be set to default values such that they are not generated by another process of the server 120.

The treemap generation engine 140 uses the inputs 302 to produce the output 304, which comprises a markup language document that the browser 130 on the client computer uses to display a treemap display page, such as the page 210 shown in FIG. 2. The output 304 of the treemap generation engine can also include one or more applets or applet references in the markup language document. The treemap display and applet information are received by the client computer browser, which can then produce the treemap display on a suitable display screen of the computer, in accordance with display instructions known to those skilled in the art. The applet may be written, for example, in the Java programming language.

Figure 4:
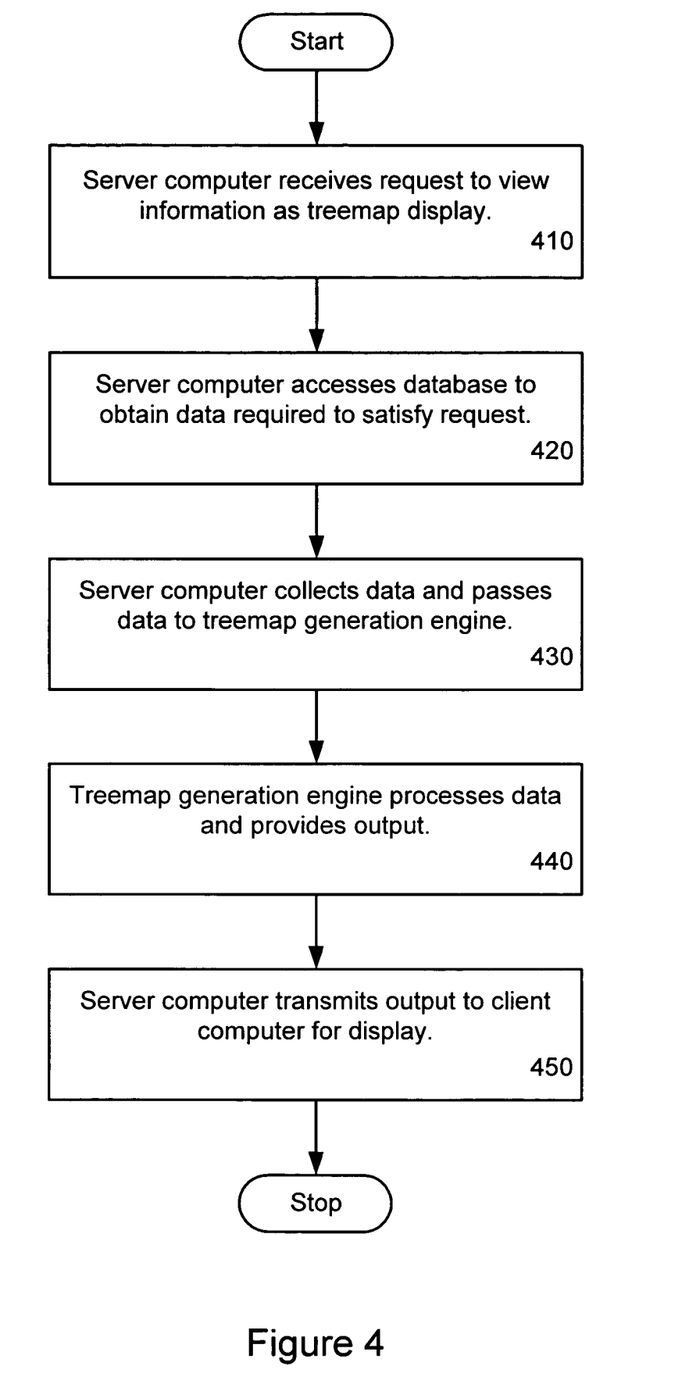
FIG. 4 is a flow diagram that describes exemplary operations performed in generating a treemap display.

FIG. 4 is a flow diagram that describes the operations performed in generating a treemap display. In the first operation, represented as the flow diagram box numbered 410, the server computer 120 receives a request from the client computer 110 to view information as a treemap display. The request may be, for example, in the form of a user-provided keyword for searching in a content database. Alternately, the request can be in the form of a URL that points to data that can be used to prepare a treemap display. A user may generate the request using a browser on the client computer 110.

In the next operation, represented by the flow diagram box numbered 420, the server computer 120 accesses a database to obtain data that satisfies the request. The content database may be data that is stored locally at one location, such as at the server computer 120. The content database may also be content that is distributed over the network 125, such as Web pages that are distributed over the Internet. The server computer 120 then collects data from the database and passes the data to the treemap generation engine 140 for processing, as represented by the flow diagram box numbered 430.

In the course of performing the operations represented by the flow diagram boxes 420 and 430, the server computer 120 may establish a connection with one or more other computers on the network 125 in order to access and collect the data that meets the client computer's request. For example, the server computer 120 may establish a connection with a Web site that comprises an Internet search engine and run the keyword search using the search engine. The server computer 120 receives the search results from the search engine, wherein the search results may be in the form of one or more Web pages that are generated by the search engine Web site. The server computer 120 then parses the results to extract relevant attributes and sets up the structured data input for the treemap generation engine 140.

The treemap generation engine 140 then processes the data and provides an output, as represented by the flow diagram box numbered 440. As discussed above, the output of the treemap generation engine 140 comprises a markup language document that is used by the browser 130 on the client computer to display a treemap display page. The server computer transmits the output to the client computer 110 over the network 125. As discussed above, the treemap display information received from the treemap generation engine by the client may include one or more applets that are executed by the client computer, resulting in the display page illustrated in FIG. 2. The processing ends with the rendering of the treemap display on the computer screen.

The operations involved in drawing a treemap display based on a set of data will now be described. In accordance with the invention, an applet at the client computer 110 performs the display operations to generate a treemap display comprised of a set of cells that have a minimum cell size. The applet assigns at least a portion of the display screen for a treemap field and then assigns a portion of a treemap field to a first cell of the treemap so that the first cell has a size. The applet then assigns a portion of the treemap field to a subsequent cell of the treemap and adjusts the size of the of the first cell in order to compensate for a size of the subsequent cell. During this process, the applet operates such that each cell has a minimum size such that adjustment of a cell size maintains the minimum cell size. The cell size may be defined in terms of display units, such as pixels of display screen area. Before generating the treemap display, the applet first organizes the data to be displayed in the treemap display as a tree data structure comprised of a hierarchical arrangement of a plurality of nodes with a single root node. Each node corresponds to a cell in the treemap display.

Each node of the tree data structure has a "size" value, which the applet uses to determine how large the node will be relative to all the other nodes in the tree. For each node in the tree structure that is not a leaf, the "size" value is the sum of the "size" values of all of its immediate children. Each set of immediate children is preferably ordered from largest size to smallest size. A user assigns the size value, which initiates the process described below. The size values can be assigned via manipulation of applet parameters or via the software application. Alternately, the size values can be automatically assigned or can have default values. The treemap display is based upon an entire tree or a portion of the tree. Thus, the root of the tree that is displayed in the treemap may be the actual parent node of the entire tree or a parent node of a portion of the entire tree.

To determine the size value of each cell in the treemap display, the applet then performs a layout process that uses several parameters, including: (1) the root node to be displayed (which is not necessarily the root of the entire tree); (2) a rectangle that defines the space into which to lay out the display; (3) the depth into the tree for which to draw the treemap (the depth is defined as the number of levels of nodes, measured from the root and counting the root that will be drawn); and (4) the minimum permissible display size allocated for a node. The minimum permissible node size can be defined in terms that control both the width and height of a node. The minimum permissible node size is preferably selected so that the smallest cell in the treemap display can be comfortably viewed by a user. The minimum permissible cell size can also be selected so that an icon or some other indicator can fit within a cell.

The applet determines the shape of the root node. If the node is in fact the root of the entire tree, then the root is allocated the entire size of the treemap field area. If the node is the root of only a portion of the entire tree, then the node is assigned a size as large as possible, while retaining its previous aspect ratio (width/height), if any.

The applet may then estimate how much space on the treemap field area (in total pixels of area) will be taken up by the group labels, if the group labels are to be displayed in gutter areas outside of the groups. This amount of space is then accounted for in assigning treemap field space to the treemap display. Alternately, the group labels may be superimposed over the groups in the treemap field area (such as shown in FIG. 2, FIG. 6, and FIG. 7) so that the group labels do not take any space in the treemap field away from display of the cells.

The applet then begins the actual layout process for the nodes of the tree, wherein the applet determines the configuration of the treemap based upon the nodes and their assigned sizes. In an exemplary embodiment, the applet performs four processes, including: a Squarify process, which determines the "row" in the treemap display that each node ends up in; a LayoutRow process, which determines the actual sizes and locations of a single "row" of nodes; a FixNode process, which ensures that a node meets the minimum size requirement (the FixNode process also accounts for any adjustments made on previous nodes that require the current node to change as well); and a Grow-PreviousNodes process, which enlarges nodes for which layout has completely finished as needed to accommodate current repairs to other nodes. It should be appreciated that other processes could also be used. Each of the processes will now be described in more detail.

The Squarify Process

The Squarify process takes as arguments: (1) a list of nodes that are the immediate children of a current node that have not yet been laid out; (2) a rectangle defining the space available on the treemap field area into which nodes can be laid out; (3) the estimated space required by labels, if any; and (4) the depth of the tree structure remaining to draw. The Squarify process is recursive in that it only handles the layout of one "row" of the treemap display at a time.

During the Squarify process, the applet first computes the amount of area (in pixels) remaining in which the nodes must be arranged, which is the size of the rectangle attribute minus the space required by the labels (if any), since such space cannot be occupied by nodes. The applet also computes the sum of the "size" values of all the nodes in the layout list. Each node is represented by a cell of the treemap display.

Figure 5:
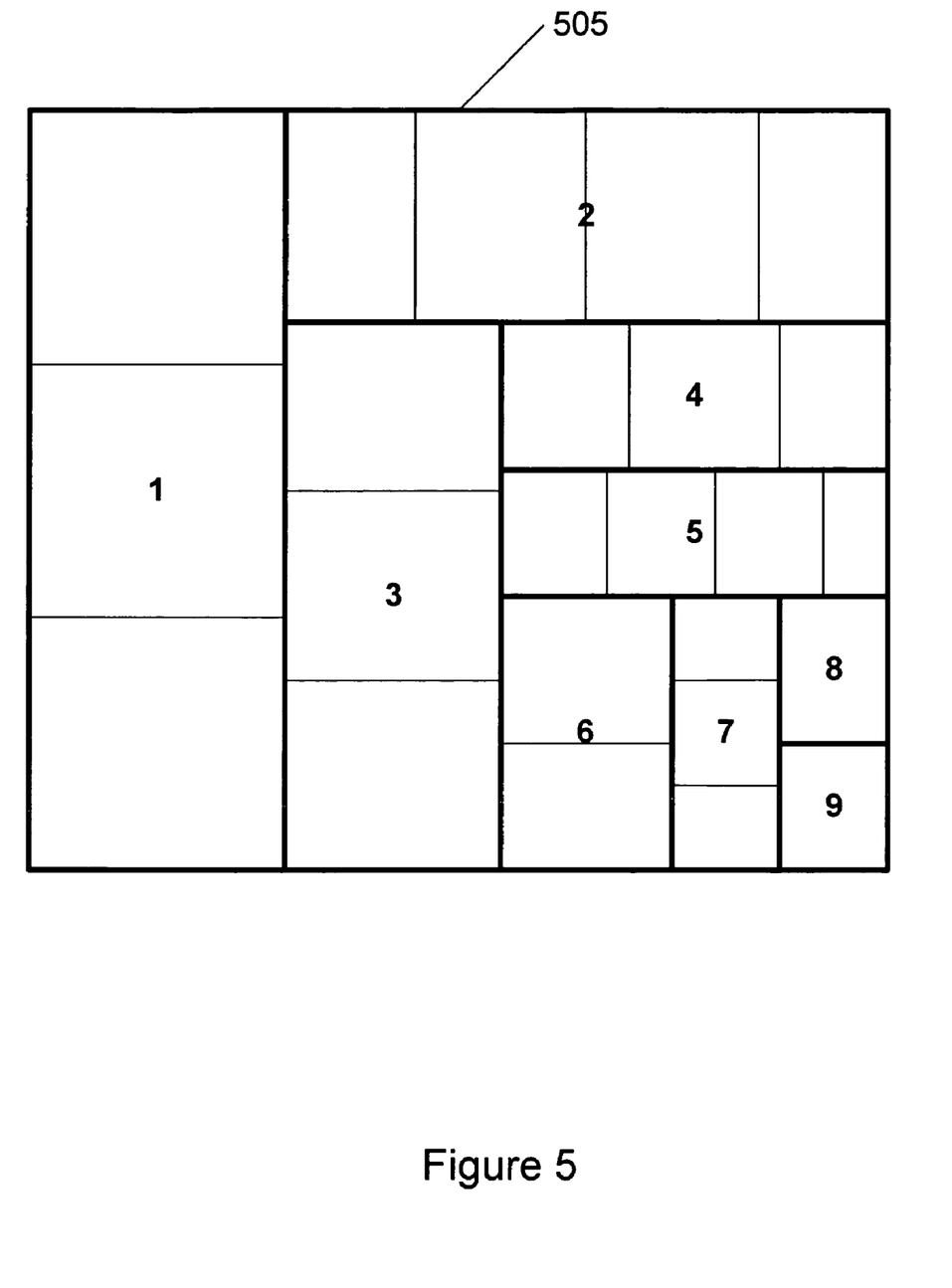
FIG. 5 is an illustration of a treemap field of a treemap display screen shot, showing a plurality of cell rows.

Next, working from largest to smallest in the layout list of nodes, the applet adds each node in turn to a new list of nodes that will make up a single "row" within the treemap display. FIG. 5 shows a treemap field 505 that has nine rows of cells, each row being numbered from 1–9 in bold lettering. As shown in FIG. 5, a row can be oriented either along the horizontal axis or vertical axis of the display field. A new row is preferably located along the axis which is the shortest in the rectangle of the remaining space. As each node is added to this "row" list, the applet computes the least desirable possible aspect ratio of any node within that "row". An aspect ratio becomes less desirable as its value moves away from a value of one (1.0), so that an aspect ratio of one is most desirable. In one embodiment, the aspect ratio is calculated by first computing the sum of the "size" values of the nodes in the row list, and determining what percentage of the total sum remaining this accounts for. In another embodiment, the aspect ratio is calculated by computing the percentages of each node's "size" relative to the sum of all node sizes remaining (node size/sum_of_node_sizes), and noting the minimum ("Min") and maximum ("Max") percentages, and the sum of all the percentages ("Sum"). The following values are then computed:

Area=area of the rectangle defining the remaining space
Aw=(length of the side of the rectangle along which the row is to be laid out)$^2$
Ar=Area*Sum
Rmax=Area*Max
Rmin=Area*Min The worst aspect ratio is then either (Aw/Ar)*(Rmax/Ar) or (Ar/Aw)*(Ar/Rmin), whichever is larger.

The applet then determines how much treemap field area the current row can be allocated using a percentage of the remaining area as discussed above. The applet has available one dimension of the new row, which is the length of the shortest side of the rectangle attribute. The applet uses this information to compute the other dimension of the row as that which results in a rectangle whose area is no larger than that previously computed, as allowed above.

Once this is done, the applet computes the aspect ratio of each node within this "row" by a similar method, using that node's "size" value, relative to the sum of the "size" values of all the nodes in the "row".

The applet adds nodes to the "row" until the worst aspect ratio stops decreasing and starts increasing again. The ideal aspect ratio is one, where the width and height are equal, and thus the most square-like. Normally, as nodes are added, the worst aspect ratio usually starts at a value that is greater than one, decreases as nodes are added, and then starts to move away from a one value again.

Once the applet compiles a layout list with the best (i.e., closest to one) aspect ratio, the applet proceeds to the LayoutRow process, which assigns the actual sizes and locations to each of the nodes. The LayoutRow process also returns the area of the treemap field defining the space occupied by this new "row," as described more fully below.

Next, the now-finished rectangle is subtracted from the rectangle which defines the remaining treemap field area into which the nodes will be arranged. The nodes just added to the "row" are then removed from the layout list of remaining nodes. If there are any nodes remaining to be laid out, the applet computes a new estimation of the label space required by the remaining nodes, and the Squarify process recourses on itself with this new set of information to compute the next row to be laid out, and so on. If there were no more nodes to be laid out, the Squarify process is complete.

If there are more nodes to lay out, the recursive Squarify process returns the amount of error adjustment that needs to be made to the row that was just laid out, in width and height. This accommodates any error adjustment made within the recursive calls for the minimum node size to be maintained.

The applet uses adjustment information to iterate over each node in the "row" that was laid out as described above, this time from smallest to largest. The applet then invokes the FixNode process on each node and uses the resultant adjustment information to adjust the size of the cells. The FixNode process results in its own set of adjustment information, in width and height, which was that required to ensure that the node it was called on met the minimum size requirement, as described further below. In subsequent invocations of the FixNode process, the applet receives the adjustment information returned by the call to the previous node. If the node just fixed is not a leaf node, and the value of the depth variable is greater than zero, then the Squarify process is called recursively on this node, with the rectangle defining that node's shape, the list of its children, location in the tree structure of the children, and an estimation of the space required by any labels on these children. The Squarify process again returns any adjustments required to meet the minimum node size, and this adjustment is added to the error returned by FixNode process above for this node.

After the applet has fixed all the nodes in the current row, it determines whether or not it is necessary to also adjust any nodes that may have been classified as complete. This could occur, for example, if the current row had to be lengthened to accommodate the node repairs. In that case, it would be longer than all the rows that had been subsequently laid out. If such an adjustment is necessary, the applet invokes the GrowPreviousNodes process with the needed width and height adjustments, as discussed below.

Next, the applet returns any remaining error which could not be absorbed by the current "row", or which was generated by this "row", for any recursively previous call to the Squarify process to handle.

The LayoutRow Process

The Layout process uses the following inputs: (1) a list of nodes to put into a row; and (2) the rectangle defining the remaining space in which to lay out the nodes in the list. The process computes the size of this row, and the sizes of each node within it, and then assign the width and height to each node in the list, from smallest to largest, and their X, Y display coordinates.

The process works from smallest to largest node because there can be errors in the sizes of each node, similar to the error which can occur in computing the size of the row as a whole. As noted above, "error" in this context refers to the situation in which the exact display unit size of a cell cannot be placed in a rectangle of the given constant dimension. Working from the smallest to largest node means that the accumulated error will be assigned to the largest node, so that the treemap display does not end up with the node which should be the smallest actually being larger than the theoretically larger node adjacent to it in the row. The applet iterates over the list, and for each node, computes the sum of the "size" values of it and all the nodes remaining to be laid out in the row, and then computes what percentage of that sum this node's "size" value is. The applet then computes what percentage of the remaining rectangle of space assigned to this row the current node gets, such that the actual area in pixels assigned to the node is no larger than the percentage it is allotted. When this is completed for all nodes in the row, the rectangle defining the space this row occupies is returned as an output of this process.

The FixNode Process

The FixNode process uses the following inputs: (1) the error accumulated in the current row (which was returned by the call to FixNode process on the previous node); (2) the error accumulated in the previous row (returned by the recursive call to Squarify process on the current list of remaining nodes); (3) the minimum allowable node size; and (4) the node to apply these to.

In a first operation, the applet adjusts the node's width and height to account for the previous errors. If the row this node is in is vertical, then an error in width results in the width of this node being decreased, and an error in height results in the height of this node being increased. As a result, the applet will adjust the Y coordinate of this node to accommodate the increase in height. If the row is horizontal, the adjustments are vice versa. The error comes from an increase in the size of previous nodes.

Next, the applet tests the node to see if its width and height both meet the minimum node size requirement. If not, the insufficient dimension is increased to meet the requirement, and the coordinate on that axis (X for width, Y for height) is likewise adjusted. Furthermore, if the node had a label associated with it, the label's location is moved to account for any adjustments made to the node.

The process finishes by returning the offsets made to the node's X and Y coordinates as the "error" values, which will need to be taken into account when fixing the next node.

The GrowPreviousNodes Process

The GrowPreviousNodes Process uses the following inputs: (1) a list of nodes to apply the adjustment to, if needed; (2) the amount of the adjustment to make; and (3) the largest node in the row whose error needs to be accounted for.

The applet iteratively performs the process over all the nodes in the adjustment list. Only nodes in the row whose edge lies along that shared by the edge of the "error node" passed in are adjusted. For each node to adjust, if the error is vertical, their height and Y location are adjusted. If the error is horizontal, their width and X location are adjusted.

Other features of the treemap display produced in accordance with the invention should be apparent from the illustrated display pages. For example, FIG. 6 shows the detail frame 605, also called a "mouseover window", and also the option menu. It should be noted that the mouseover window includes the relative rank of the selected cell, in the case where the treemap display represents search engine results or some other hierarchical display listing. It should be apparent from FIG. 6 that the mouseover window is displayed adjacent to the cell with which it is associated, which is indicated in FIG. 6 with a white border.

FIG. 7 shows a treemap display in which 1,000 cells are available for viewing. FIG. 7 shows that the cells are positioned into five groups, comprising a group "Top 10", a group "11–100", another that is "101–200", another that is "201–500", and the last group being "501–1000". In the illustrated browser display pages, the display screen area allocated to the one thousand cells display of FIG. 7 is no greater than the screen area allocated for the two hundred cells of FIG. 6. In the preferred embodiment, the size of the detail frames produced for FIG. 7 will be the same size as the detail frames produced for FIG. 6. The treemap display of FIG. 7 also shows the feature of coloring a cell differently if it has been designated, or "visited", by the user.

FIG. 7 also shows that a cell may be marked with a tracking character or icon, shown in FIG. 7 as a "C" character in a cell of the "501–1000" group. Thus, as noted above, the minimum cell size will be selected such that the tracking character will be able to fit within the smallest displayed cell. The cell to be tracked is designated through the detail frame option menu (FIG. 6). Once a cell has been designated for tracking, the tracking character will remain associated with that cell as the user conducts filtering operations or otherwise conducts viewing operations on the other cells of the treemap display. Thus, a user can mark cells that are of interest for later revisiting. This feature and the others described above permit easier viewing and navigation of the large amounts of data typically provided in a treemap display. In this way, the present invention increases the usefulness of treemap displays by providing for a minimum cell size and providing navigational aids. These features are advantageously provided by a treemap engine that produces the improved treemap display described above.

Figure 8:
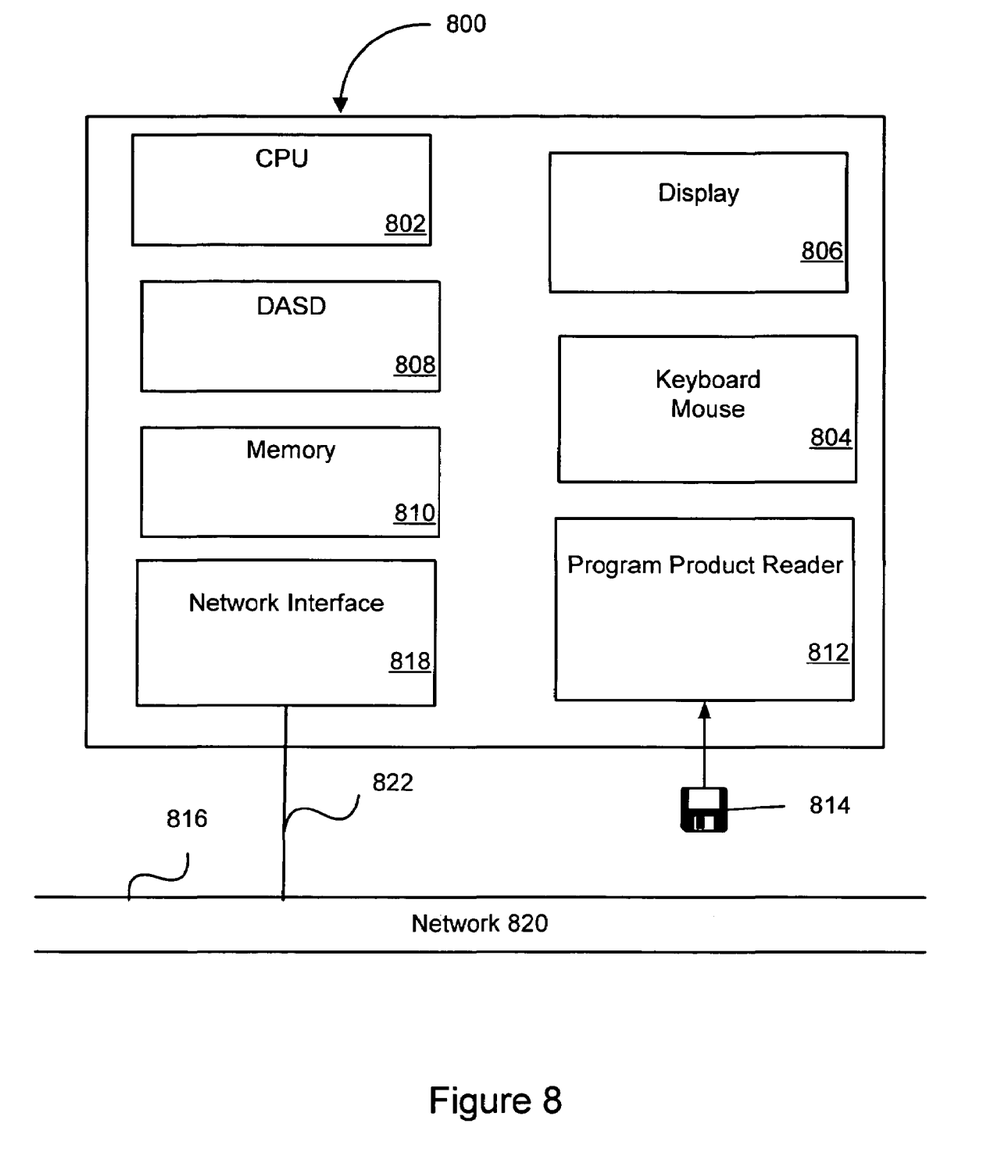
FIG. 8 is a block diagram of a computer of the system shown in FIG. 1, illustrating the hardware components for one of the computers.

FIG. 8 is a block diagram of a computer of the system shown in FIG. 1, illustrating the hardware components for one of the computers. Those skilled in the art will appreciate that the computers 110, 120 can all have a similar computer construction to the computer shown in FIG. 8.

FIG. 8 is a block diagram of an exemplary computer 800 such as might comprise any of the computers shown in FIG. 2. The computer 800 operates under control of a central processor unit (CPU) 802. The configuration of the computer can vary.

With reference still to FIG. 8, a computer user can input commands and data from input device(s) such as a keyboard and/or computer mouse 804, and can view inputs and computer output at a display 806. The display is typically a video monitor or flat panel display. The computer 800 also includes a direct access storage device (DASD) 808, such as a hard disk drive. The memory 810 typically comprises volatile semiconductor random access memory (RAM). Each computer can include a program product reader 812 that accepts a program product storage device 814, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer 800 can communicate with the others over a computer network 820 (such as the Internet or an intranet) through a network interface 818 that enables communication over a connection 822 between the network 820 and the computer. The network interface 818 typically comprises, for example, a Network Interface Card (NIC) or a modem that permits communications over a variety of networks.

The CPU 802 operates under control of programming steps that are temporarily stored in the memory 810 of the computer 800. When the programming steps are executed, the computer performs its functions. Thus, the programming steps implement the functionality described herein. The programming steps can be received from the DASD 808, through the program product storage device 814, or through the network connection 822. The program product storage drive 812 can receive a program product 814, read programming steps recorded thereon, and transfer the programming steps into the memory 810 for execution by the CPU 802. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 810 over the network 820. In the network method, the computer receives data including program steps into the memory 810 through the network interface 818 after network communication has been established over the network connection 822 by well-known methods that will be understood by those skilled in the art without further explanation. The program steps are then executed by the CPU 802 thereby comprising a computer process.

It should be understood that all of the computers of the system illustrated in FIG. 2 can have a construction similar to that shown in FIG. 8, so that details described with respect to the computer 800 will be understood to apply to the computers 110, 120 of the system. Alternatively, any of the computers can have an alternative construction, so long as they can communicate with the other computers and support the functionality described herein.

The present invention has been described above in terms of a presently preferred embodiment so that an understanding of the present invention can be conveyed. There are, however, many configurations for the system and methods not specifically described herein but with which the present invention is applicable. The present invention should therefore not be seen as limited to the particular embodiment described herein, but rather, it should be understood that the present invention has wide applicability with respect to network systems and data display systems generally. All modifications, variations, or equivalent arrangements and implementations that are within the scope of the attached claims should therefore be considered within the scope of the invention.

What is claimed:

1. A method of generating a treemap display on a computer display screen, comprising:
    assigning at least a portion of the display screen for a treemap field;
    assigning a portion of a treemap field to a first cell of the treemap so that the first cell has a size;
    assigning a portion of the treemap field to a subsequent cell of the treemap; and
    adjusting the size of the first cell in order to compensate for a size of the subsequent cell;
wherein each of the cells has a minimum size such that adjustment of a cell size maintains the minimum cell size.

2. A method as defined in claim 1, wherein the minimum size of each cell is defined in display units.

3. A method as defined in claim 2, wherein the display units are pixels.

4. A method as defined in claim 1, additionally comprising assigning a portion of a display screen to a first row of cells and subsequently assigning a portion of the display screen to a second row of cells.

5. A method as defined in claim 1, wherein adjusting the size of the first cell comprises increasing the size of the first cell.

6. A method as defined in claim 1, wherein adjusting the size of the first cell comprises decreasing the size of the first cell.

7. A method as defined in claim 1, additionally comprising assigning a cell to a first row of the treemap.

8. A method as defined in claim 1, additionally comprising assigning a cell to a second row of the treemap.

9. A method as defined in claim 1, wherein the minimum cell size has a default value.

10. A method as defined in claim 1, wherein the minimum cell size is assigned by a user.

11. A method as defined in claim 1, wherein each cell has rectangular shape and an aspect ratio and wherein a cell size is adjusted so as to move the aspect ratio of each cell towards a value of one.

12. A system for generating a treemap display on a computer display screen, comprising:
    a memory in which instructions and data are stored; and a processor, coupled to the memory, such that the processor receives the instructions stored in the memory and executes the instructions to perform operations comprising:

assigning at least a portion of the display screen for a treemap field;

assigning a portion of a treemap field to a first cell of the treemap so that the first cell has a size;

assigning a portion of the treemap field to a subsequent cell of the treemap; and adjusting the size of the of the first cell in order to compensate for a size of the subsequent cell;

wherein each of the cells has a minimum size such that adjustment of a cell size maintains the minimum cell size.

13. A system as defined in claim 12, wherein the minimum size of each cell is defined in display units.

14. A system as defined in claim 12, wherein the display units are pixels.

15. A system as defined in claim 12, wherein each cell has a rectangular shape and an aspect ratio, and wherein a cell size is adjusted so as to move the aspect ratio of each cell towards a value of one.

16. A system as defined in claim 12, wherein adjusting the size of the first cell comprises increasing the size of the first cell.

17. A system as defined in claim 12, wherein adjusting the size of the first cell comprises decreasing the size of the first cell.

18. A program product for use in a computer that executes program steps recorded in a computer-readable media to perform a method of generating a treemap display on a computer display screen, the program product comprising:

a recordable media; and computer-readable instructions recorded on the recordable media, comprising instructions executable by the computer to perform operations comprising:

assigning at least a portion of the display screen for a treemap field;

assigning a portion of a treemap field to a first cell of the treemap so that the first cell has a size;

assigning a portion of the treemap field to a subsequent cell of the treemap; and adjusting the size of the first cell in order to compensate for a size of the subsequent cell;

wherein each of the cells has a minimum size such that adjustment of a cell size maintains the minimum cell size.

19. A program product as defined in claim 18, wherein each cell has rectangular shape and an aspect ratio and wherein a cell size is adjusted so as to move the aspect ratio of each cell towards a value of one.

20. A program product as defined in claim 18, wherein the display units are pixels.

* * * * *